United States Patent
Aguilar

(10) Patent No.: US 9,429,036 B2
(45) Date of Patent: Aug. 30, 2016

(54) COOLING SYSTEM FOR CONTROL VALVE ACTUATORS

(71) Applicant: General Electric Company, Schenectady, NY (US)

(72) Inventor: Jose Francisco Aguilar, Queretaro (MX)

(73) Assignee: General Electric Company, Schenectady, NY (US)

( * ) Notice: Subject to any disclaimer, the term of this patent is extended or adjusted under 35 U.S.C. 154(b) by 533 days.

(21) Appl. No.: 14/034,624

(22) Filed: Sep. 24, 2013

(65) Prior Publication Data
US 2015/0086338 A1 Mar. 26, 2015

(51) Int. Cl.
*F01D 25/12* (2006.01)
*F16K 49/00* (2006.01)

(52) U.S. Cl.
CPC .............. *F01D 25/12* (2013.01); *F16K 49/005* (2013.01); *Y10T 137/0396* (2015.04); *Y10T 137/86389* (2015.04)

(58) Field of Classification Search
CPC ........ F01D 25/00; F01D 25/08; F01D 25/12; F16K 49/005
See application file for complete search history.

(56) References Cited

U.S. PATENT DOCUMENTS

| | | | |
|---|---|---|---|
| 4,466,459 A | 8/1984 | Higgins | |
| 5,448,890 A * | 9/1995 | Coughlan, III | ....... F16K 49/005 60/734 |
| 5,791,744 A | 8/1998 | Wood et al. | |
| 7,520,574 B2 | 4/2009 | Schweikert et al. | |
| 2004/0130205 A1 | 7/2004 | Wood et al. | |
| 2005/0082906 A1 | 4/2005 | Wood et al. | |

FOREIGN PATENT DOCUMENTS

| | | |
|---|---|---|
| EP | 0 083 833 | 7/1983 |
| EP | 0 855 319 A2 | 7/1998 |
| EP | 1 437 281 A | 7/2004 |
| GB | 754 153 A | 8/1956 |
| WO | 2007/126579 A1 | 8/2007 |

* cited by examiner

*Primary Examiner* — Richard Edgar
(74) *Attorney, Agent, or Firm* — Sutherlan Asbill & Brennan LLP

(57) ABSTRACT

The present application provides a control valve actuator cooling system for providing a flow of cooling air to a control valve actuator. The control valve actuator cooling system may include a pressurized air source with the flow of cooling air, an air timing valve system, and a cooling air discharge port positioned about the control valve actuator such that the air timing valve system provides the flow of cooling air to the control valve actuator on an intermittent basis.

20 Claims, 3 Drawing Sheets

COOLING SYSTEM FOR CONTROL VALVE ACTUATORS

TECHNICAL FIELD

The present application and the resultant patent relate generally to gas turbine engines and more particularly relate to an auxiliary air cooling system for cooling control valve actuators via air timing valves and the like instead of complex electrical components.

BACKGROUND OF THE INVENTION

In gas turbine engines, a portion of the total airflow from the compressor may be diverted to cool various turbine components. Specifically, a flow of bleed air may be extracted from a stage of the compressor to cool a stage of the turbine or other components. This diverted airflow, however, may consume a significant portion of the total airflow through the compressor. The management and control of these parasitic airflows thus may increase the overall efficiency and performance of the gas turbine engine.

The airflow extractions from the compressor may be controlled by one or more control valves positioned on the extraction lines. Although the actuators for these control valves generally may be mounted externally to the gas turbine enclosure so as to protect the actuators from the high temperatures within the enclosure, there are some control valves installed within the enclosure. The internal air surrounding these control valves may reach high temperatures and may be somewhat stagnant. In such situations, the heat reaching the control valves may not be dissipated such that the actuators may fail due to the high temperatures. As a result, known actuator cooling system may use complex mechanical or electronic devices so as to provide cooling. These cooling systems thus may be a parasitic drain on the overall gas turbine engine.

There is thus a desire for an improved control valve actuator cooling system. Preferably such an improved system may provide cooling to the control valve actuators without the use of complex components so as to provide increased reliability and decreased costs.

SUMMARY OF THE INVENTION

The present application and the resultant patent thus provide a control valve actuator cooling system for providing a flow of cooling air to a control valve actuator. The control valve actuator cooling system may include a pressurized air source with the flow of cooling air, an air timing valve system, and a cooling air discharge port positioned about the control valve actuator such that the air timing valve system provides the flow of cooling air to the control valve actuator on an intermittent basis. The intermittent basis may vary.

The present application and the resultant patent further provide a method of cooling an actuator used with a control valve in a gas turbine engine. The method may include the steps of providing a source of pressurized air, flowing the pressurized air to an air timing valve system, building pressure within the air timing valve system, opening the air timing valve system at a predetermined pressure, and flowing the pressurized air to the actuator for a predetermined length of time to cool the actuator. The predetermined length of time may vary.

The present application and the resultant patent further provide a gas turbine engine. The gas turbine engine may include a compressor, a turbine, and an air extraction system extending from the compressor to the turbine. The air extraction system may include one or more control valve actuators positioned about the turbine and a control valve actuator cooling system for providing an intermittent flow of cooling air to the control valve actuators.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
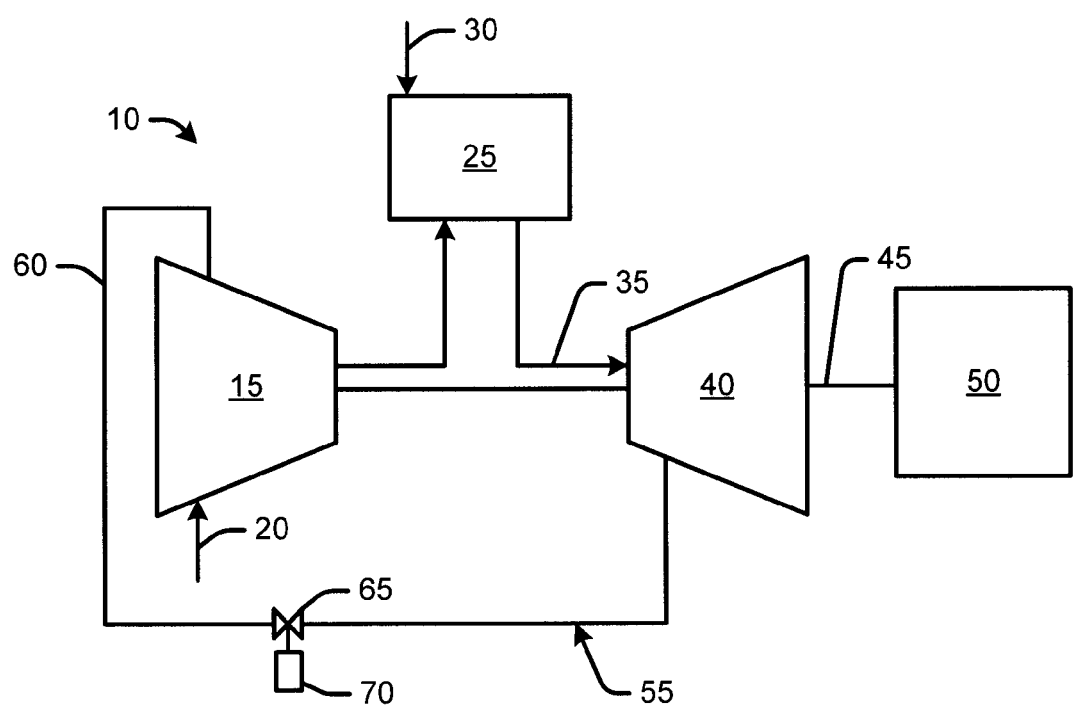
FIG. 1 is a schematic diagram of a gas turbine engine showing a compressor, a combustor, a turbine, a load, and an extraction line.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may include an air extraction system 55. As described above, one or more extractions of high pressure air may be taken from the compressor 15 and delivered to the turbine 40 or elsewhere for cooling purposes. The air extraction system 55 may include a number of air extractions lines 60. Although only one air extraction line 60 is shown, the air extraction system 55 may have any number of air extraction lines as well as related bypass lines, ejectors, and other components. The air extraction line 60 may have one or more control valves 65 positioned thereon. Each control valve 65 may be operated by an actuator 70. The actuator 70 may be a solenoid and the like for largely on/off operation. Other types of actuators may be known. Although the actuator 70 may be mounted externally to the turbine enclosure, the actuator 70 may be in a high temperature environment. The air extraction system 55 described herein is for the purpose of example only. Many other types of air extraction systems and components thereof may be known.

Figure 2:
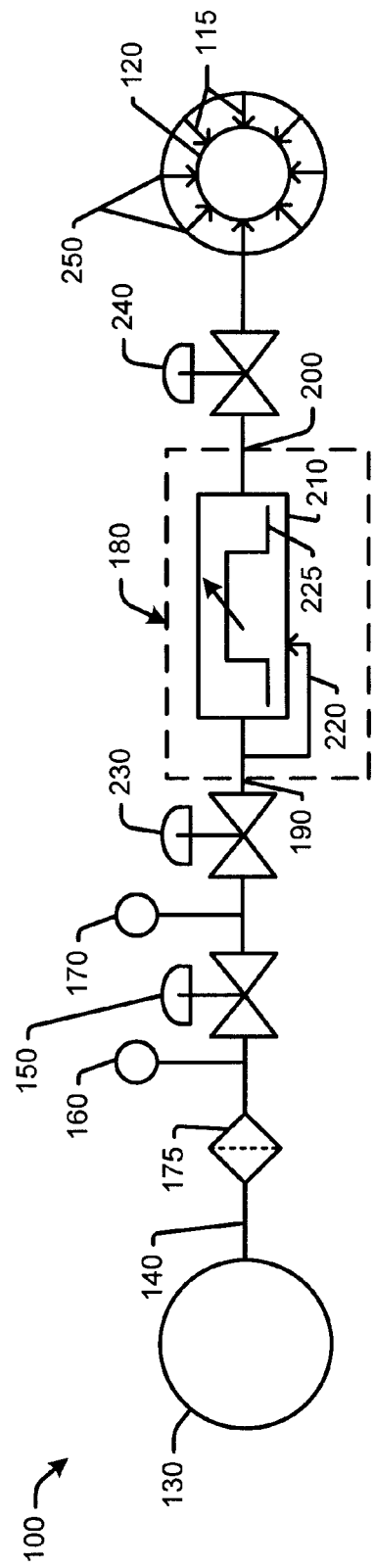
FIG. 2 is a schematic diagram of a control valve actuator cooling system as may be described herein.
Figure 3:
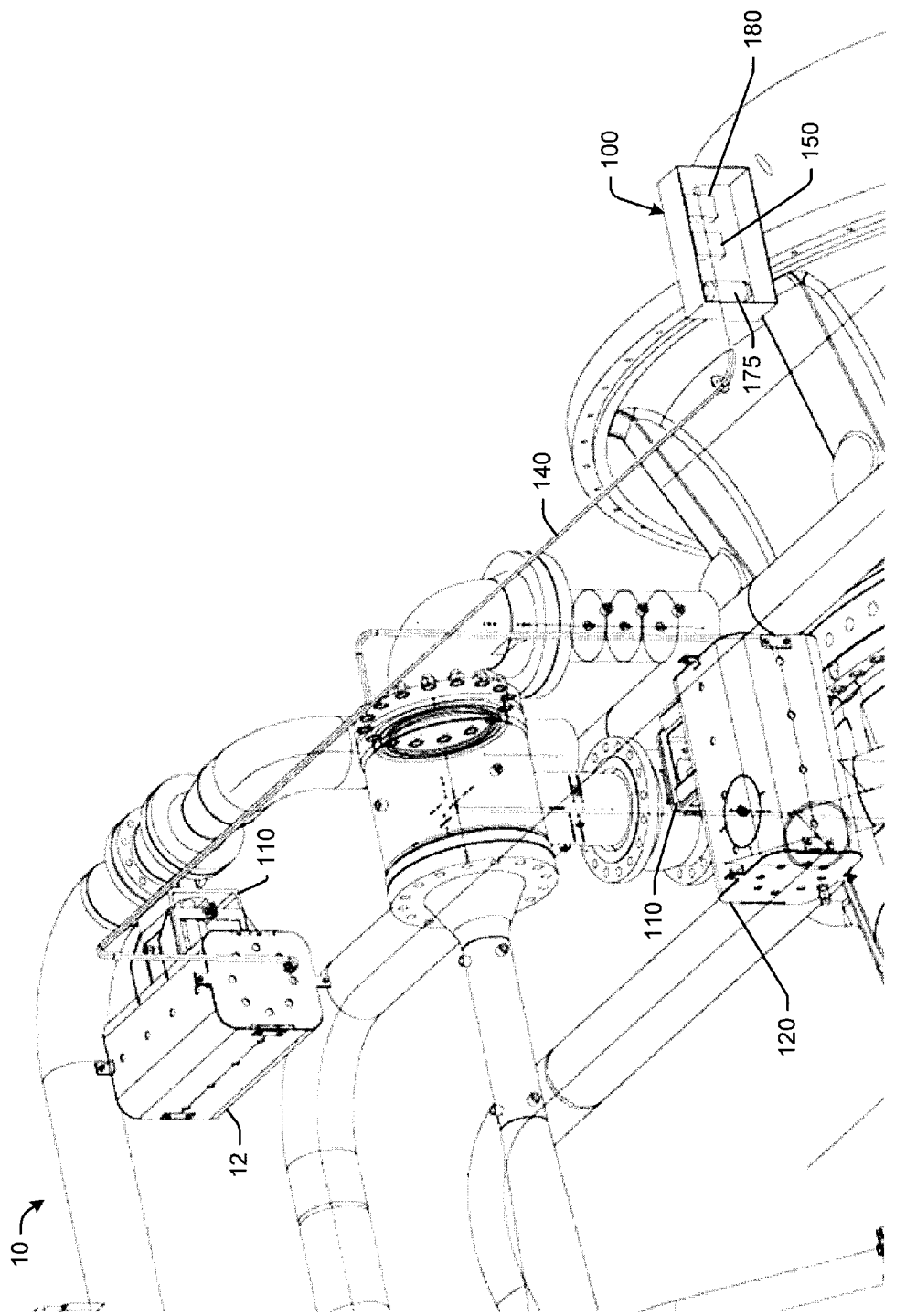
FIG. 3 is a perspective view of the control valve actuator cooling system of FIG. 2 positioned about a gas turbine engine.

FIGS. 2 and 3 show an example of a control valve actuator cooling system 100 as may be described herein. The control valve actuator cooling system 100 may be used with a control valve 110 of the air extraction system 55 or other systems of the gas turbine engine 10. Any number of the control valves 110 may be used herein. Similar to those described above, the control valve 110 may be operated by an actuator 120. The actuator 120 may include a solenoid and the like for largely on/off operation. Other types of actuators and other types of control devices may be used herein. Any number of the actuators 120 or other types of devices may be used and cooled herein.

The control valve actuator cooling system 100 may include a pressurized air source 130 for providing the flow of cooling air 115. The pressurized air source 130 may be any source of pressurized air including, for example, instrumentation air and the like. Other types of pressurized air sources 130 may be used. The pressurized air source 130 may be in communication with the actuator 120 via a cooling air line 140. Depending upon the pressure of the pressurized air source 130, the control valve actuator cooling system 100 may include a pressure regulator 150 on the cooling air line 140. The pressure regulator 150 may be of conventional design. An upstream pressure gauge 160 and a downstream pressure gauge 170 may be positioned about the pressure regulator 150. The pressure regulator 150 and the pressure gauges 160, 170 may ensure that the air flowing therethrough is within a predetermined pressure range. The pressure gauges 160, 170 may be of conventional design. In this example, the pressurized air source 130 may be at about 70 bar or so. The pressure regulator 150 may reduce the pressure to about 0.7 bar or so. Other pressures may be used herein. One or more filters 175 may be positioned on the cooling air line 140. Other components and other configurations may be used herein.

The control valve actuator cooling system 100 also may include an air timing valve system 180 positioned upstream of the actuator 120. The air timing valve system 180 may have an input port 190 and an output port 200 positioned on the cooling air line 140. The air timing valve system 180 may include an adjustable timing valve 210 positioned between the input port 190 and the output port 200. The adjustable timing valve 210 may be fed from a timing valve line 220 upstream thereof. The adjustable timing valve 210 may have an internal diaphragm 225 and the like. The size of the internal diaphragm 225 and other components within the adjustable timing valve 210 may vary so as to accommodate different pressures and timing therein. The adjustable timing valve 210 may be of conventional design.

Suitable air timing valve systems 180 may be offered by Festo Corporation of Hauppauge, N.Y. under the designation "PZVT" and the like. Moreover, suitable air timing valve systems 180 also may be offered by SMC Corporation of America of Yorba Linda, Calif. under the designation "MVR Air timer" and "KLC Air Timer". Other types of suitable air timing valve systems may be used herein. An upstream isolation valve 230 and a downstream isolation valve 240 may surround the adjustable timing valve 210. The isolation valves 230, 240 may be of conventional design.

The control valve actuator cooling system 100 also may include one or more cooling air discharge ports 250 positioned about the cooling air line 140. The cooling air discharge port 250 may be positioned about the actuator 120 so as to provide the flow of cooling air 115 thereto. Depending upon the configuration of the actuator 120, the cooling air discharge port 250 may be positioned within a heat shield or a similar type of structure. The cooling air discharge port 250 may have any size, shape, or configuration. Other components and other configurations also may be used herein. More than one cooling air discharge port 250 may be fed from the control valve actuator cooling system 100. Different control valve actuator cooling systems 100 may have different cooling sequences and the different cooling sequences may be varied.

In use, the control valve actuator cooling system 100 provides a flow of the cooling air 115 to the actuators 120 on an intermittent basis. Specifically, the adjustable timing valve 210 of the air timing valve system 180 may be kept in the off or closed position. The flow of cooling air from the pressurized air source 130 may flow through the pressure regulator 150 and the cooling air line 140. A portion of the flow of cooling air 115 may be diverted via the timing valve line 220 into the adjustable timing valve 210. When the pressure and/or volume within the adjustable timing valve 210 reaches a predetermined value, the adjustable timing valve 210 opens such that the flow of cooling air 115 may pass through the inlet port 190 and the output port 200 of the air timing valve system 180 to the cooling air discharge ports 250 positioned about the actuator 120. The cooling air 115 thus cools the actuator 120 for a predetermined amount of time until the pressure within the adjustable timing valve 210 again drops so as to close the air timing valve system 180. (Although the adjustable timing valve 210 has been described in terms of being normally closed, other embodiments may use the adjustable timing valve 210 that may be normally in an open position.)

The control valve actuator cooling system 100 thus provides a flow of cooling air to the actuators 120 without the use of complex electrical or electro-mechanical components. Rather, the air timing valve system 180 uses the flow of cooling air 115 as both the cooling fluid and the power source. The timing of the intermittent cooling sequence may be varied. The control valve actuator cooling system 100 thus may reduce the temperature rating of the valve and the associated equipment therewith. Moreover, the control valve actuator cooling system 100 may reduce the capital investment with respect to the cost of the product while increasing overall system reliability.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A control valve actuator cooling system for providing a flow of cooling air to a control valve actuator, comprising:
    a pressurized air source with the flow of cooling air;
    an air timing valve system; and
    a cooling air discharge port positioned about the control valve actuator such that the air timing valve system provides the flow of cooling air to the control valve actuator on an intermittent basis.

2. The control valve actuator cooling system of claim 1, further comprising a cooling air line in communication with the pressurized air source, the air timing valve system, and the cooling air discharge port.

3. The control valve actuator cooling system of claim 1, further comprising a pressure regulator positioned downstream of the pressurized air source.

4. The control valve actuator cooling system of claim 1, further comprising one or more pressure gauges positioned downstream of the pressurized air source.

5. The control valve actuator cooling system of claim 1, further comprising one or more filters positioned downstream of the pressurized air source.

6. The control valve actuator cooling system of claim 1, wherein the air timing valve system comprises an input port, an adjustable timing valve, and an output port.

7. The control valve actuator cooling system of claim 6, wherein the air timing valve system comprises a timing valve line upstream of the adjustable timing valve.

8. The control valve actuator cooling system of claim 6, wherein the adjustable timing valve comprises an internal diaphragm.

9. The control valve actuator cooling system of claim 6, wherein the air timing valve system comprises one or more isolation valves positioned about the input port and/or the output port.

10. The control valve actuator cooling system of claim 1, wherein the pressurized air source comprises a flow of instrumentation air.

11. The control valve actuator cooling system of claim 1, wherein the control valve actuator comprises a solenoid.

12. The control valve actuator cooling system of claim 1, further comprising a plurality of cooling air discharge ports.

13. The control valve actuator cooling system of claim 1, wherein the control valve actuator cooling system is positioned about an air extraction system.

14. The control valve actuator cooling system of claim 1, wherein the control valve actuator is in communication with a control valve.

15. A method of cooling an actuator used with a control valve in a gas turbine engine, comprising:
providing a source of pressurized air;
flowing the pressurized air to an air timing valve system;
building pressure within the air timing valve system;
opening the air timing valve system at a predetermined pressure; and
flowing the pressurized air to the actuator for a predetermined length of time to cool the actuator.

16. A gas turbine engine, comprising:
a compressor;
a turbine; and
an air extraction system extending from the compressor to the turbine;
the air extraction system comprising one or more control valve actuators positioned about the turbine; and
a control valve actuator cooling system for providing an intermittent flow of cooling air to the one or more control valve actuators.

17. The gas turbine engine of claim 16, wherein the cooling valve actuator cooling system comprises a pressurized air source with the flow of cooling air.

18. The gas turbine engine of claim 16, wherein the cooling valve actuator cooling system comprises an air timing valve system.

19. The gas turbine engine of claim 18, wherein the air timing valve system comprises an adjustable timing valve in communication with a timing valve line.

20. The gas turbine engine of claim 16, wherein the air timing valve system comprises a cooling air discharge port positioned about the one or more control valve actuators.

* * * * *